2,791,489

METHOD OF REMOVING CARBON FROM A MIXTURE OF BARIUM OXIDE AND CARBON

Henry W. Rahn, Corpus Christi, Tex., assignor to Columbia-Southern Chemical Corporation, Allegheny County, Pa., a corporation of Delaware No Drawing. Application April 1, 1952, Serial No. 279,785

4 Claims. (Cl. 23—186)

This invention relates to a method of separating elemental carbon from barium oxide. It is known that barium carbonate-carbon mixtures may be calcined, usually in a stream of nitrogen, to produce barium oxide. The amount of carbon required or used normally is about 6 percent by weight of the barium carbonate. This is approximately the stoichiometric amount required according to the equation:

$$BaCO_3 + C \rightarrow BaO + 2CO$$

This calcination usually is accompanied by fusion problems which may be minimised by larger amounts of carbon. However, the excess carbon remains in the barium oxide so obtained.

For many purposes, this carbon is objectionable. For example, where it is desirable to react barium oxide with air or oxygen, the carbon also reacts, producing carbon dioxide which, in turn, is absorbed by the barium oxide, producing barium carbonate. This inevitably reduces the yield of barium peroxide.

According to this invention, it has been discovered that the carbon in barium oxide can be reduced in concentration, with at least partial avoidance of barium carbonate formation, by heating the barium oxide-carbon mixture in a stream of oxygen containing gas in which the oxygen content is less than that of air, preferably less than about 15 percent by volume. The remainder of the gas may be nitrogen, helium or other inert or nonreactive gas, i. e., a gas which does not react with the barium oxide during the operation. The temperature at which this process is to be conducted may be any temperature at which oxygen reacts with carbon. Usually, temperatures of 500 to 1200° C. are suitable.

Since the process contemplated is associated with methods of calcining barium carbonate and peroxidizing the barium oxide thus produced, it will be described in connection therewith. However, it will be understood that this invention is applicable to general use and is not necessarily confined to the processes of calcination hereinafter disclosed.

Thermal decomposition of barium carbonate is complicated by two factors which become operative at the temperatures necessary to produce barium oxide under the conditions proposed heretofore, namely, the formation of a $BaCO_3$—$BaO$ eutectic that melts at a temperature below the decomposition temperature of barium carbonate, and attack of all common refractory materials by the hot barium oxide, particularly by the fused mass which is especially corrosive toward refractory silicates. Pure barium carbonate decomposes in the vicinity of 1360° C., while fusion in the production of barium oxide from the carbonate has been observed as low as about 1030° C. Experience has shown that fusion during the calcination yields a product which is quite inactive toward peroxidation, and the inability to obtain a high yield of satisfactorily reactive barium oxide has thus militated strongly against economical operation under prior proposals.

Barium carbonate may be calcined by heating at a temperature above 1360° C. However, such serious fusion occurs that the process is hardly practical. On the other hand, where carbon is present and the reaction is conducted in a stream of inert gas, such as nitrogen, the reaction proceeds at a much lower level, usually ranging between 800 to 1100° C. This is particularly advantageous because the reaction must be conducted using an indirect method of heating since it simplifies the problem of obtaining metals or other heat-conductive materials of construction which will withstand the chemical and mechanical attack inherent in the process.

It is also desirable to prevent appreciable concentrations of water, carbon dioxide, and oxygen from entering the calcination zone. Oxygen is objectionable since it tends to react with the carbon, forming carbon dioxide. This not only uses up carbon which would otherwise be available for the reduction but, also, tends to reverse the reaction and make it more difficult to cause the reaction to proceed to substantial completion. Carbon dioxide, of course, has a like objection. Water is objectionable since it tends to cause barium hydrate which promotes fusion.

The theoretical amount of carbon required to react with the barium carbonate to produce barium oxide and carbon monoxide is about 6 percent by weight of the barium carbonate. Where the carbon concentration exceeds more than about 6 percent, there exists a tendency for the carbon to remain in the barium oxide product produced. The present invention permits use of concentration well in excess of 6 percent and frequently as much as 10 to 20 percent or more by weight of the barium carbonate. Such larger amounts of carbon reduce or minimize fusion problems which arise during calcination.

As described in a copending application of Henry Rahn and Charles Sindlinger, Serial No. 279,786, filed even date with the present application, now U. S. Patent No. 2,772,950, it has been found that tendency toward fusion may be materially reduced by maintaining a high concentration of barium oxide in the bed undergoing calcination. This may be accomplished, for example, by establishing a bed heated to calcination temperature and containing at least 50 percent, and preferably in excess of 90 percent, by weight of barium oxide, and adding barium carbonate thereto while withdrawing barium oxide, the rates of addition and withdrawal being such that the BaO content of the bed does not fall below 50 percent for any appreciable period, and preferably remains above 90 percent by weight during the calcination. Alternatively, barium oxide may be mixed with barium carbonate in amounts equal to 50 percent or more of the barium carbonate-barium oxide content of the mixture, and the mixture introduced into the calcination zone. By recourse to this procedure, the fusion or sintering encountered in prior processes is avoided or minimized to a degree sufficient to permit flow of the material through a calcination zone and, thus, the process may be conducted in a continuous or semi-continuous manner.

The specific details of an effective method of calcination are described in the above mentioned application Serial No. 279,786 and need not be repeated here.

The resulting product produced by the above described process is largely barium oxide and contains small amounts of barium carbonate (less than 10 percent and usually 1 to 5 percent by weight of the BaO and $BaCO_3$ in the calcined product), depending upon the degree of calcination, together with 1 to 12 percent by weight of barium peroxide, based upon the weight of the calcined product.

As has been already explained, the presence of excess carbon in the barium carbonate undergoing calcination is objectionable where the barium oxide produced is used for production of barium peroxide. For this reason, it is desirable to use the theoretical amount of carbon required to react with barium carbonate to produce barium oxide and carbon monoxide, or even less than such amount. On the other hand, it frequently becomes necessary to use more carbon in order to avoid fusion or objectionable sintering. Hence, carbon frequently is present in the calcined product.

It has been found that the carbon content of barium oxide may be reduced without excessive generation of barium carbonate by heating the barium oxide-carbon mixture in a stream of oxygen and an inert gas, such as nitrogen, helium, etc., which contains less than 20 percent, and preferably less than 5 to 10 percent, by volume of oxygen. The temperature of heating need only be high enough to ensure rapid reaction of the carbon with oxygen, preferably to produce carbon monoxide, and the heating may be conducted in any convenient manner. Temperatures above about 500° C. are preferred. For example, the calcined granules may be withdrawn from the fluidized bed and transferred to another reactor where they are again fluidized in a hot stream of nitrogen containing a small amount of oxygen. Alternatively, a static bed may be subject to this treatment.

The following experiment is illustrative:

*Example 1*

One and one-half grams of barium carbonate was mixed with 7.5 percent lampblack, based upon the weight of the barium carbonate. This mixture was placed in a refractory tube and heated at a temperature of 1000° C. while passing nitrogen through the barium carbonate-carbon mixture at a rate of 5 cubic centimeters of nitrogen per second and oxygen at one cubic centimeter per second, measured at 70° F. and atmospheric pressure, over a period of 15 minutes.

The calcined barium carbonate, which contained approximately 1½ percent residual carbon, was heated at 1000° C. while passing 5 cubic centimeters per second of nitrogen and one cubic centimeter per second of air, measured at room temperature and atmospheric pressure, for a period of 15 minutes. Approximately 70 percent of the carbon was removed from the reaction mixture without formation of carbonate. The remainder of the carbon produced the barium carbonate. No residual carbon remained. When the process was repeated using one part of air and one part of nitrogen by volume, the same result was obtained. However, when the time of heating was reduced to 5 minutes and one part of air and one part of nitrogen were used, only about 30 percent of the carbon was oxidized without combination with the barium oxide.

It will be understood that the above process may be applied to the removal of carbon from the pellets produced by the calcination processes described above.

Although the present invention has been described with particular reference to the specific details of certain embodiments, such details should not be regarded as imposing limitations upon the scope of the invention except insofar as such limitations are included in the accompanying claims.

This application is related to copending applications Serial Nos. 279,786, filed April 1, 1952, and 279,787, filed April 1, 1952.

What is claimed is:

1. A method of removing carbon from a mixture which is preponderantly composed of carbon and barium oxide, said mixture having been produced by calcination of a mixture of barium carbonate and carbon in a previous operation, which comprises burning carbon out of said mixture in a gaseous mixture which consists substantially wholly of oxygen and an inert gas, which mixture contains less than 15 percent by volume of oxygen, and continuing said burning until the amount of carbon in the barium oxide-carbon mixture has been substantially reduced.

2. The process of claim 1 wherein the oxygen in the mixture is less than 10 percent by volume.

3. A method of preparing barium oxide which comprises calcining a mixture of barium carbonate and carbon thereby producing a mixture of barium oxide and carbon and thereafter in a separate operation burning carbon out of the barium oxide-carbon mixture in a gaseous mixture of oxygen and gas which is inert to barium oxide, said gaseous mixture containing a substantial amount but less than 15 percent by volume of oxygen.

4. The process of claim 3 wherein the inert gas is nitrogen.

References Cited in the file of this patent

UNITED STATES PATENTS

| 886,607 | Jacobs | May 5, 1908 |
| 1,041,583 | Bornemann | Oct. 15, 1912 |
| 1,913,289 | Rentschler | June 6, 1933 |
| 1,947,952 | Nitzschke | Feb. 20, 1934 |

FOREIGN PATENTS

| 615,381 | France | Oct. 11, 1926 |
| 13,519 | Great Britain | 1897 |
| 3,628 of 1890 | Great Britain | Feb. 14, 1891 |

OTHER REFERENCES

J. W. Mellor's "A Comprehensive Treatise on Inorganic and Theoretical Chem.," vol. 8, pages 4, 5 and 8; 1928 ed. Longmans, Green and Co., N. Y.